3,313,855
TRIMETHYLAMINE-IMINE DI(TERT.)BUTANOL AND PROCESS OF PREPARATION

Rolf Appel, Bonn, Germany, assignor to Olin Mathieson Chemical Corporation
No Drawing. Filed Jan. 28, 1964, Ser. No. 340,816
Claims priority, application Germany, July 3, 1963, O 9,522
2 Claims. (Cl. 260—583)

This invention relates to a novel composition of matter and methods of producing it. The novel composition is the adduct, trimethylamine-imine di(tert.)butanol and has the formula $(CH_3)_3NNH.2(CH_3)_3COH$.

Wittig et al., Ann. 562, 181 and 183 (1949) briefly describe the reaction of phenyl lithium with 1,1,1-trimethylhydrazinium iodide to form trimethylamine-imine having the formula $(CH_3)_3NNH$. Trimethylamine-imine can better be prepared by the reaction of potassium amide in liquid ammonia and 1,1,1-trimethylhydrazinium salts, especially 1,1,1-trimethylhydrazinium chloride.

Trimethylamine-imine reacts vigorously with water and lower aliphatic alcohols, sometimes with ignition. It is an extremely useful reagent for the introduction of the NH group under mild conditions into a variety of compounds particularly Lewis bases, having unshared electron pairs and including as examples, triphenylphosphine, triphenylarsine and triphenylstibine. It is also useful for the introduction of the NH groups in place of the carbonyl oxygen of ketones. Benzophenone is thus converted to benzophenone-imine.

Trimethylamine-imine forms the novel dibutanol adduct of the present invention which undergoes the same reactions and forms the same products as free trimethylamine-imine itself with ketones and Lewis bases but with moderated violence. The novel dibutanol adduct is a crystalline solid of low volatility and pungent odor. The infrared spectrum of the dibutanol adduct is similar to that of trimethylamine-imine itself, both showing the 3280 cm.$^{-1}$ line due to the NH group. It is very hygroscopic but stable in dry air and is readily soluble in organic and inorganic solvents. It is possible to prepare, handle, store and ship the dibutanol adduct whereas this is not possible or feasible with the free trimethylamine-imine.

The trimethylamine-imine butanol adduct of this invention is readily prepared by reacting 1,1,1-trimethylhydrazinium salts, notably the halides and especially the chloride with alkali metal tertiary butylates, especially the sodium or potassium tertiary butylates, in an excess of the alcohol. After removing alkali metal halide, the novel product is obtained as a residue on evaporation of the excess alcohol, preferably under reduced pressure.

Example

An excess of absolute tertiary butanol was heated under reflux with 40 g. (1 gram atom) of potassium until the metal dissolved. Excess butanol was removed in vacuum and the residue was finally heated briefly to 100° C. The residual white potassium tertiary butylate, still containing considerable butanol was suspended in 1500 ml. of absolute tetrahydrofuran and 110 g. (1 mole) of 1,1,1-trimethylhydrazinium chloride, dried in vacuum at 100° C., was added. The reaction mixture was stirred at room temperature for 2 days and then stood 24 hours without stirring at room temperature. The clear tetrahydrofuran phase was decanted from the crystalline potassium chloride and the solvent was distilled off at room temperature in a water bath at a pressure of 1 to 10 mm. into a receiver cooled to −80° C. In the residue precipitated 147.3 g. or 66% of the theoretical yield of trimethylamine-imine dibutanol adduct in the form of clear plate-like crystals which were filtered off and dried in vacuum. By working up the mother liquor, further crystal fractions of the product were obtained. The purity of the product was determined directly by acidimetric titration using Indicator M.

0.42116 g. required n/10 HCl: Calc.; 18.9 ml. Found: 18.9 ml.

The microanalyses suffer from considerable weighing errors with this extraordinarily hygroscopic substance.

Calc. for $C_{11}H_{30}N_2O_2$: C, 59.45; H, 13.61; N, 12.6. Found: C, 56.71; H, 13.13; N, 14.17.

The compound melts in a sealed tube under nitrogen at 88° C. (with decomposition).

Molecular weight by freezing point depression in benzene, 227. Theory, 222.

On mixing an ether solution of trimethylamine-imine di(tert.)butanol with an ether solution containing a stoichiometric proportion of benzophenone (molar ratio 1:1) and evaporating to dryness, benzophenone-imine is obtained.

What is claimed is:
1. Trimethylamine-imine di(tert.)butanol.
2. Method of preparing trimethylamine-imine di(tert.) butanol by the steps of maintaining a reaction mixture consisting essentially of tetrahydrofuran and equimolar proportions of potassium tert.-butylate and 1,1,1-trimethylhydrazinium chloride in reactive contact for 3 days at room temperature under anhydrous conditions to produce a slurry of potassium chloride in a tetrahydrofuran solution of the resulting trimethylamine-imine di(tert.)butanol reaction product, mechanically separating the said potassium chloride from the said solution and distilling the tetrahydrofuran from the said trimethylamine-imine di(tert.)butanol to recover the said trimethylamine-imine di(tert.)butanol.

No references cited.

CHARLES B. PARKER, *Primary Examiner.*
R. L. RAYMOND, *Assistant Examiner.*